(12) United States Patent
Visagathilagar et al.

(10) Patent No.: US 8,792,754 B2
(45) Date of Patent: Jul. 29, 2014

(54) MODALMETRIC FIBRE SENSOR

(75) Inventors: Yuvaraja Visagathilagar, Wantirna South (AU); Jim Katsifolis, Northcote (AU); Bernhard Koziol, Lower Plenty (AU)

(73) Assignee: Future Fibre Technologies Pty Ltd, Mulgrave (AU)

( * ) Notice: Subject to any disclaimer, the term of this patent is extended or adjusted under 35 U.S.C. 154(b) by 198 days.

(21) Appl. No.: 13/501,846

(22) PCT Filed: Oct. 13, 2010

(86) PCT No.: PCT/AU2010/001344
§ 371 (c)(1),
(2), (4) Date: Jul. 25, 2012

(87) PCT Pub. No.: WO2011/044619
PCT Pub. Date: Apr. 21, 2011

(65) Prior Publication Data
US 2012/0281946 A1 Nov. 8, 2012

(30) Foreign Application Priority Data
Oct. 14, 2009 (AU) .................. 2009905025

(51) Int. Cl.
*G02B 6/00* (2006.01)
*G02B 6/26* (2006.01)
*G02B 6/28* (2006.01)
*G02B 6/32* (2006.01)

(52) U.S. Cl.
CPC ............. *G02B 6/268* (2013.01); *G02B 6/262* (2013.01); *G02B 6/264* (2013.01); *G02B 6/327* (2013.01)

USPC .................. 385/12; 385/15; 385/27; 385/28; 385/31; 385/39; 385/50

(58) Field of Classification Search
CPC ............................ G02B 6/268; G02B 6/327
USPC ....................................... 385/12, 28
See application file for complete search history.

(56) References Cited

U.S. PATENT DOCUMENTS

| 4,843,233 A | 6/1989 | Jeunhomme |
| 2003/0002769 A1 | 1/2003 | Lovely et al. |

FOREIGN PATENT DOCUMENTS

| WO | 96/08695 | 3/1996 |
| WO | 2009/111820 | 9/2009 |

OTHER PUBLICATIONS

PCT/AU2010/001344 International Search Report dated Dec. 22, 2010 (2 pages).

*Primary Examiner* — Ryan Lepisto
(74) *Attorney, Agent, or Firm* — Michael Best & Friedrich LLP

(57) ABSTRACT

A modalmetric fiber sensor comprising a multimode sensor fiber; a light source for launching light into the multimode sensor fiber to produce a multimode speckle pattern of light at an end of the multimode sensor fiber; a single mode fiber to receive light from the multimode speckle pattern; a detector connected to the single mode fiber to detect the received light from the speckle pattern; and a further multimode fiber disposed between the end of the sensor fiber and the single mode fiber such that the single mode fiber receives light from the speckle pattern by transmission through the further multimode fiber and the received light includes higher order modes regenerated in the further multimode fiber, wherein the further multimode fiber is overfilled with received light from the speckle pattern.

19 Claims, 4 Drawing Sheets

MODALMETRIC FIBRE SENSOR

FIELD OF THE INVENTION

This invention relates to a modalmetric fibre sensor for use in a wide range of physical sensors such as acoustic or vibration sensors, patient monitoring sensors, intrusion detection systems and the like.

BACKGROUND OF THE INVENTION

A modalmetric fibre sensor, or modal domain sensor, is based on measuring a change in the speckle pattern output of a multimode (MM) fibre. When coherent light is injected into a standard MM fibre, a large number of modes are excited which will propagate down the fibre. At the output of the fibre, the interference of the modes produces a pattern known as a speckle pattern. Any disturbance to the fibre which can cause a change in any one of the phase, polarisation and distribution of the modes, will cause the speckle pattern to change. By measuring this change, a physical perturbation to the fibre such as a vibration or strain can be detected. The modalmetric sensor is therefore a multi-beam interferometer encapsulated within one fibre, where each beam can be represented by one of the propagating modes.

The detection of a perturbation using the modalmetric effect usually involves detecting a change in the speckle pattern by sampling or interrogating only part of the overall speckle pattern. This can be done through the use of a physical restricting means where only part of the speckle pattern is detected, or through the use of a CCD detector to electronically sample the required area or speckle pattern sub-zone. This is because a negligible change in intensity of power is detected if the whole speckle pattern is being analysed during a perturbation to the MM fibre.

PRIOR ART

A number of modalmetric sensor configurations have been described in the literature. Most of these are transmissive configurations where light is injected into the sensing multimode fibre and the speckle pattern at the output of the multimode fibre is interrogated. Other configurations are single-ended where light is injected into a MM fibre via a single mode (SM) fibre, reflected off a mirrored end at the second end of the MM fibre, and the speckle pattern interrogated at the first end of the MM fibre. The interrogation means can vary and includes one of using a single mode fibre to view at least part of the speckle pattern, using a traditional spatial filter, or the use of a CCD camera to process only part of the speckle pattern. Such sensors usually have a laser light source, a coupler for coupling the light from the laser light source into a lead-in single mode fibre which is fusion spliced to a sensing multimode fibre.

In one reflective arrangement the multimode fibre may have a mirrored end for reflecting light back to the coupler and then to a signal processing section to detect a change in the speckle pattern. When light is injected from the laser source through the coupler and a single mode fibre into the MM fibre, it will essentially excite many core-guided modes as well as some cladding-guided modes. It is assumed that any cladding-guided modes will be quickly attenuated over the first few meters or less especially given that fibres typically have coatings whose refractive index is higher than the cladding index. Light will be reflected from the remote mirrored endface of the MM fibre and then return back to the input of the MM fibre where there will be a speckle pattern which is formed by the interference of all the modes present at this point in the fibre.

In the reflective arrangement the same single mode fibre which injected the light into the MM fibre can also act as a receiver of the returning light. Due to its relatively smaller core size with respect to the multimode fibre, it will also act as a spatial filter as the SM fibre will effectively only see the very central part of the speckle-pattern. The power from this central part of the speckle pattern will then be received by the detector via the coupler.

Any change in or redistribution of the speckle pattern will be detected as a change in intensity. Since the SM fibre supports only a single mode, it can also act as the insensitive lead-in of the sensing system. The coupler, being a bidirectional device, allows the simultaneous transmission and reception of light to and from the sensor fibre respectively.

Spatial filtering is preferred as the total power in the overall speckle pattern shows no or negligible change when the MM fibre is perturbed by a vibration. By only monitoring part of the overall speckle pattern, a change in the position of the speckles will be easily detected as a change in intensity at the detector. This signal can then be processed to determine and measure the presence of the perturbation. Using this approach, a MM fibre can be used as a sensor in an intrusion detection system.

A number of spatial filtering, or restriction techniques have been previously reported for modalmetric sensors, such as the use of a custom made spacer means between the SM and MM fibre by Lovely (U.S. Pat. No. 5,144,689), the use of CCD detector by Spillman (U.S. Pat. No. 7,189,958), the use of a SM to MM fusion splice by Tapanes (Australian patent No. 688113), and the use of a more basic free space spatial filter by Fuhr et al. More recently a much improved technique was described in International Patent Application No. PCT/AU2009/000279 whereby the speckle pattern at a multimode (MM) fibre end is interrogated by a single mode (SM) fibre wherein the end faces of said MM and SM fibre ends are disposed at an acute angle from one another. The present invention also enables improved sensitivity to be achieved in a modalmetric sensor.

SUMMARY OF THE INVENTION

A modalmetric fibre sensor according to the invention may comprise a multimode sensor fibre;

a light source for launching light into the multimode sensor fibre to produce a multimode speckle pattern of light at an end of said multimode sensor fibre;

a single mode fibre to receive light from the multimode speckle pattern;

a detector connected to the single mode fibre to detect the received light from the speckle pattern; and a further multimode fibre disposed between said end of the sensor fibre and the single mode fibre such that the single mode fibre receives light from the speckle pattern by transmission through the further multimode fibre and the received light includes higher order modes regenerated in the further multimode fibre.

The further multimode fibre may be overfilled with received light from the speckle pattern.

Said end of the sensor fibre may be connected to a light receiving end of the further multimode fibre.

The further multimode fibre may have a smaller core diameter than the sensor fibre. More specifically, the core diameter of the further multimode fibre is less than 90% of the diameter of the sensor fibre.

In one arrangement, said end of the sensor fibre and the light receiving end of the further multimode fibre may be interengaged, for example in a fusion splice.

In another arrangement said end of the sensor fibre and the light receiving end of the further multimode fibre may be held spaced apart such that the light received by the further multimode fibre from the speckled pattern is in a divergent beam.

In another alternative arrangement said end of the sensor fibre and the light receiving end of the further multimode fibre may be connected by a beam expander.

The further multimode fibre may have a length of less than 100 meters and may be less than 10 meters long. More specifically, it may have a length in the range 30 to 100 cm and even more particularly in the range 45 to 55 cm.

The light received by the single mode fibre may be transmitted through end faces of the further multimode fibre and the single mode fibre which are disposed at an acute angle to one another.

The end face of the further multimode fibre may be normal to the multimode fibre axis and the end face of the single mode fibre may be angled away from the normal to the axis of the single mode fibre through said acute angle, which may be in the range 5° to 10° and more particularly in the range 6° to 9°.

In a reflective arrangement the light source may be connected to said single mode fibre so as to launch light through the single mode fibre into said end of the multimode fibre via the further multimode fibre and the other end of the multimode fibre may be mirrored for reflecting light back through the multimode fibre to produce the speckle pattern at the first said end of the multimode fibre. In this arrangement, the light source and the detector may be connected to the single mode fibre by a coupler.

In a transmission arrangement, the light source may launch light into an end of the sensor fibre remote from the first said end of that fibre for transmission through the sensor fibre, the further multimode fibre and the single mode fibre to the detector. In that arrangement the light source may be connected to the remote end of the sensor fibre via a further single mode fibre through which to launch light into the remote end of the sensor fibre.

BRIEF DESCRIPTION OF THE DRAWINGS

In order that the invention may be more fully explained, some specific embodiments will be described with reference to the accompanying drawings, in which.

DETAILED DESCRIPTION OF THE EMBODIMENTS OF THE INVENTION

Figure 1:
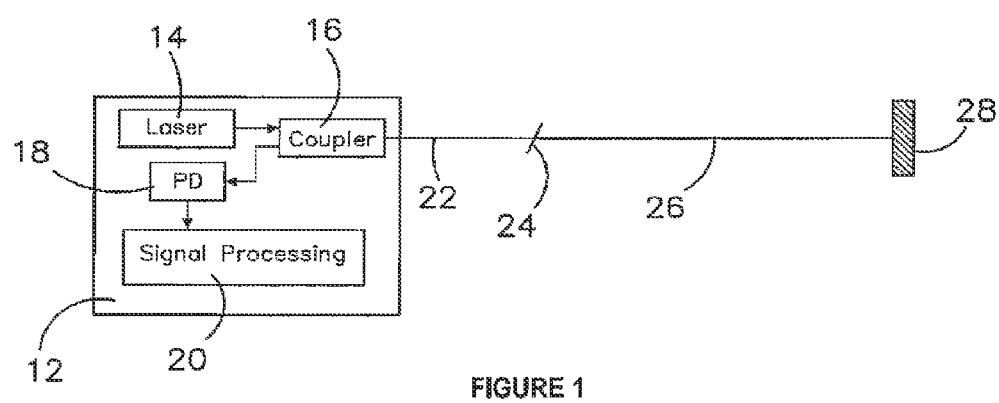
FIG. 1 is a diagram of a conventional reflective modalmetric sensor.

With reference to FIG. 1 which shows a prior art arrangement, a control section 12 has a laser light source 14, a coupler 16, a photo detector 18 and a signal processor 20.

Light from the laser source 14 is provided to the coupler 16 and launched into a single mode fibre 22. The single mode fibre is fusion spliced at 24 to a multimode fibre 26 which has a mirrored end 28. Light travels from the single mode fibre 22, which acts as a both a lead in and lead out fibre, to the multimode sensing fibre 26 which has a distal mirrored end 28. Light travelling down the multimode fibre reflects off the mirrored end and travels back towards the singe mode fibre 22. Any vibration or perturbation of the multimode fibre 26 causes a change in the speckle pattern of the light present at the launch end of the multimode fibre. That light travels back to the coupler and into the detector 18. The detector 18 outputs a signal indicative of a change in the speckle pattern created by the interfering modes in the multimode fibre 26, to the signal processor 20 for analysis.

In the configuration of FIG. 1 the multimode fibre 26 and single mode fibre 22 are fusion spliced at 24 so as to be concentrically aligned. Since the single mode fibre 22 has a much smaller core size than the multimode fibre 26, it acts as a spatial filter so that the power reaching the detector will be from the very central part of the speckle pattern. For a relatively long multimode fibre sensing length, this part of the speckle pattern typically shows a smaller amount of spatial change or redistribution in response to an external perturbation to the multimode sensing fibre than outer parts of the pattern. This can be related to the fact that after the light has propagated a relatively large distance (more than tens of meters), the speckle pattern is made up of the interference of predominatly lower order core modes and so this part of the speckle pattern is dominated by lower order modes guided in the multimode fibre. This in turn can limit maximum sensitivity.

Figure 2:
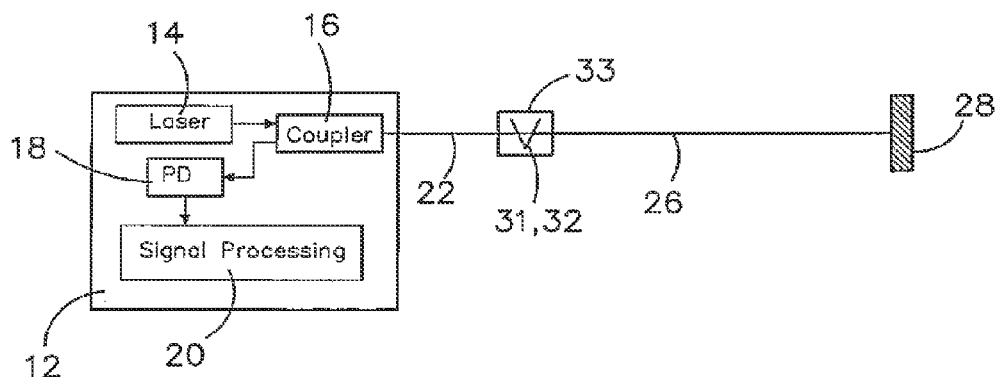
FIG. 2 is diagram of a reflective modalmetric sensor of the invention described in International Patent Application No. PCT/AU2009/000279.

FIG. 2 illustrates a single ended (reflective) modalmetric sensor made in accordance with an improved technique described in International Patent Application No. PCT/AU2009/000279. This sensor is similar in layout to the prior art sensor of FIG. 1 and it comprises many of the same components which are identified by like reference numerals. The essential difference in this configuration is that the single mode fibre 22 and the multimode fibre 26 have end faces 31,32 disposed at an acute angle to one another and held within a fibre connector 33. The manner in which the fibre end faces 31,32 are angled relative to one another enables the sensitivity of the modalmetric fibre sensor to be enhanced in the manner that is fully explained in International Application No PCT/AU2009/000279.

Figure 3:
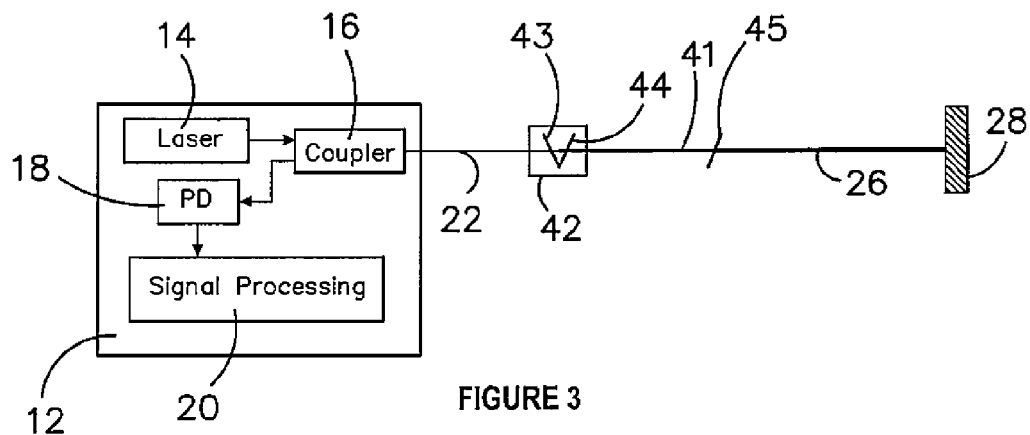
FIG. 3 is a diagram of a reflective modalmetric sensor of the present invention.
Figure 4:
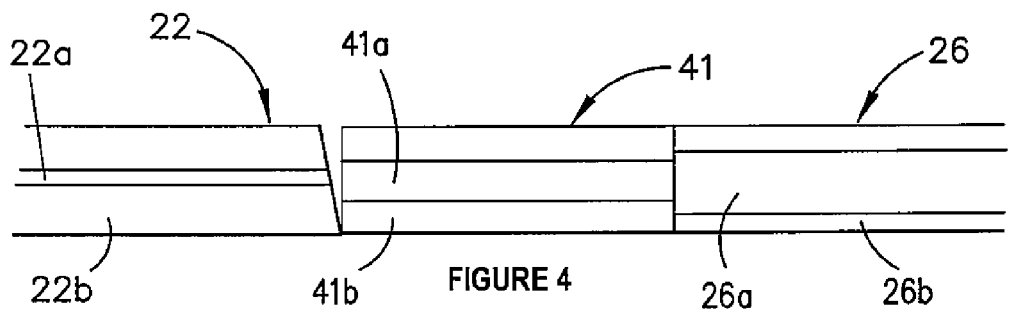
FIG. 4 is a diagram of a one implementation of the higher order mode regenerator in a reflective modalmetric sensor for improving sensitivity in accordance with the invention.

Whilst the configuration in FIG. 2 is well suited to many perimeter fence-based intrusion detection applications, it is possible to further increase the sensitivity of the modalmetric system described in FIG. 2 by adding a further short section of multimode fibre 41 which has a smaller core diameter than the sensing fibre, between the sensing fibre 26 and the angled single mode fibre 22 as shown in FIGS. 3 and 4. In this arrangement a fibre connector 42 holds ends of the single mode fibre 22 and the further multimode fibre 41 with their end faces 43, 44 disposed at an acute angle to one another and within the connector 42. The other end of the further multimode fibre 41 is fusion spliced at 45 to the sensor fibre 26. In FIG. 4, SM fibre 22 is shown as having a core 22a and cladding 22b, MM fibre 26 has a core 26a and cladding 26b and MM fibre 41 has a core 41a and cladding 41b.

Referring to FIG. 3 light is injected into the single mode fibre 22 from the laser 14 via the coupler 16. This light will propagate into the SM fibre, after which it will pass through a relatively short length of MM fibre 41 which plays an important role when the light is reflected back to it from the mirrored end of the sensing MM fibre. Light from fibre 41 will then propagate into the sensing MM fibre 26 which has a larger core diameter than fibre 41. This will excite many core-guided modes as well as some cladding-guided modes. It is assumed that any cladding-guided modes will be largely attenuated over the first few meters or less especially for fibres which have acrylate coatings which have a higher refractive index than the fibre cladding. Light will be reflected from the remote mirrored end-face 28 of the MM sensor fibre 26 and then return back to the input of the sensor MM fibre where there will be a speckle pattern which is formed by the interference of all the modes present at this point in the fibre.

Since the sensing lengths of the sensing MM fibre 26 when applied to applications such as perimeter security intrusion detection systems can be typically in the hundreds of meters, the distribution of modes in the multimode sensor fibre will approach an equilibrium state known as an equilibrium mode distribution (EMD). In this state the modes in the multimode sensor fibre are predominantly made up of lower order and tightly confined core-guided modes which predominantly fill about 70% of the fibre's core area. This will result in a reduced speckle pattern area when compared with the speckle pattern exiting a much shorter length of multimode fibre. Because lower order core modes are less sensitive to perturbations on the fibre, this will effectively limit the maximum sensitivity of the modalmetric sensor as described earlier.

It would be advantageous to be able to easily produce a speckle pattern with more higher order modes such that there is a larger contrasting spatial redistribution of modes (or equivalently speckles) when the MM sensing fibre undergoes a disturbance. This could increase the sensitivity of the modalmetric system to perturbations on the sensing fibre. This is achieved in the arrangement of FIGS. 3 and 4 by the insertion of the relatively short further multimode fibre 41 with a smaller core diameter between the sensor MM fibre 26 and the SM fibre 22. By using a short length of the MM fibre 41 with a smaller core diameter than the sensor MM fibre in between the sensor MM fibre 26 and SM fibre 21, the shorter length MM fibre 41 will become overfilled with modes which includes lower order and higher order core modes and can also include some cladding modes.

As seen in FIG. 4, the sensor MM fibre 26 has a larger core diameter than the short length of MM fibre 41 which allows the light exiting the larger core MM fibre 26 to excite both lower order and higher order core modes as well as cladding modes in the smaller MM fibre 41. The short length of MM fibre 41 now becomes a higher order mode regenerator as the light from the larger core fibre is distributed across more modes in the smaller core fibre essentially creating a speckle pattern that is more sensitive to perturbations on the sensing fibre and whose central speckle intensity is contributed to by a combination of lower and higher order modes. Any smaller intensity based change in the spatial distribution of the speckle pattern exiting the larger core MM sensor fibre 26 will be transformed into a larger intensity change in the spatial distribution of the speckle pattern exiting the relatively short length of the higher order mode regenerating MM fibre 41. This will result in a larger transient intensity change in the speckle pattern for a given disturbance on the larger core sensing MM fibre. One end of the smaller core MM fibre can be connected at 45 to the larger core MM fibre through the use of a standard splice or fibre connector. The other end of the higher order mode regenerator is connected to the SM fibre 22 by connector 42 with the fibre ends 43,44 disposed at an acute angle to one another, for example an angle in the range 5° to 10° and more particularly in the range 6° to 9° for the reasons explained in International Patent Application No. PCT/AU2009/000279.

To take advantage of this effect it is important that the higher order mode regenerating MM fibre 41 is of a relatively short length such that the higher order core modes which are generated are not attenuated as would occur over a large distance of more than 100 meters. It is generally preferred that the higher order regenerating MM fibre is of a length less than 10 meters.

Tests of the invention described herein show that relatively higher sensitivities can be obtained for a higher order mode regenerator length of between 30 and 100 cm with the optimum sensitivity achieved for a length of approximately 50 cm. It is believed that the reason for this is that it provides an ideal balance between lower and higher order core modes whose resulting interference creates speckles across the fibre core, and in particular the central region that is interrogated by the single fibre, with a higher contrast of speckle redistribution or intensity change upon disturbance of the sensing fibre. Shorter lengths may include too many higher order and cladding modes which may reduce the contrast of speckle redistribution. Longer lengths may lead to the loss of too many higher order modes which can also reduce the contrast of speckle redistribution. This is supported by the observation of a number of speckle patterns from different lengths of 50/125 µm fibres excited by light from 100 m long 62.5/125 µm lead-in fibre with an equilibrium mode distribution. An enhanced change in intensity of the central region of the speckle pattern from the 50/125 µm fibre is evident for the above quoted length range.

Figure 5:
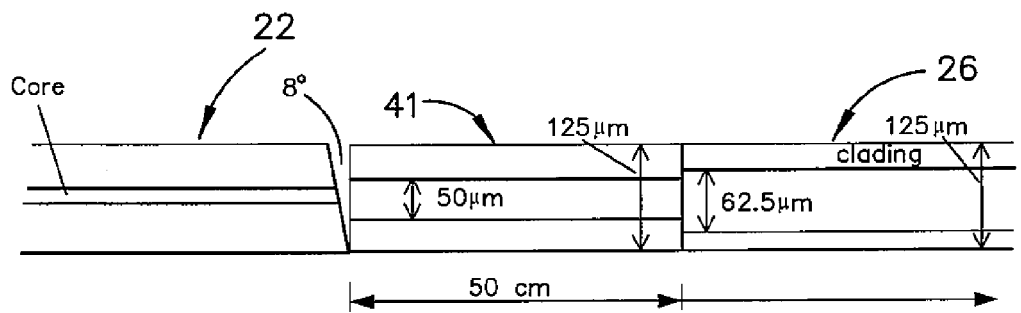
FIG. 5 is an example of the embodiment described in FIG. 4 to overfill a MM fibre used in a higher order mode regenerator with standard optical fibres.

A practical implementation of the embodiment described in FIGS. 3 and 4 can be achieved by using standard graded index 62.5/125 µm multimode fibre for the sensing fibre, and standard graded-index 50/125 µm fibre for the higher order mode regenerator as shown in FIG. 5. For the SM fibre, standard telecommunications grade 9/125 µm can be used. The SM fibre has an end face at an acute angle of approximately 8°.

Figure 6:
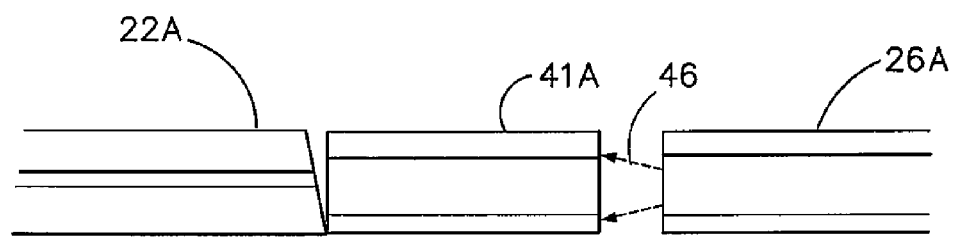
FIG. 6 illustrates an alternative method for overfilling a higher order mode regenerator when used in a modalmetric sensor.

Other coupling techniques can also be implemented to overfill a higher order mode regenerating MM fibre placed between the sensing fibre and the receiving SM fibre. Another embodiment shown in FIG. 6, uses a short length of MM fibre 41A similar to the sensing fibre 26A but spaced apart by a small distance to allow the speckle pattern exiting the sensing fibre 26 to diverge in beam 46 into a size larger than the core of the fibre. This will then overfill the receiving higher order mode regenerating fibre 41A to excite higher order modes as before.

Figure 7:
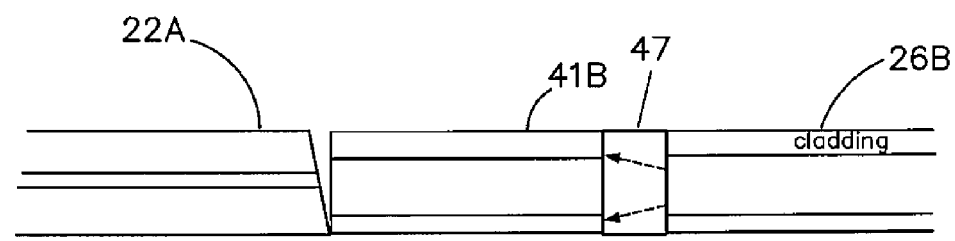
FIG. 7 illustrates yet another alternative method for overfilling a higher order mode regenerator when used in a modalmetric sensor.

A further embodiment illustrated in FIG. 7 employs a beam expanding device 47 disposed between similar sensing and higher order mode regenerating MM fibres 26B, 41B to achieve an overfilled fibre. The beam expander also allows the flexibility of different MM fibres with a range of core diameters to be used.

Figure 8:
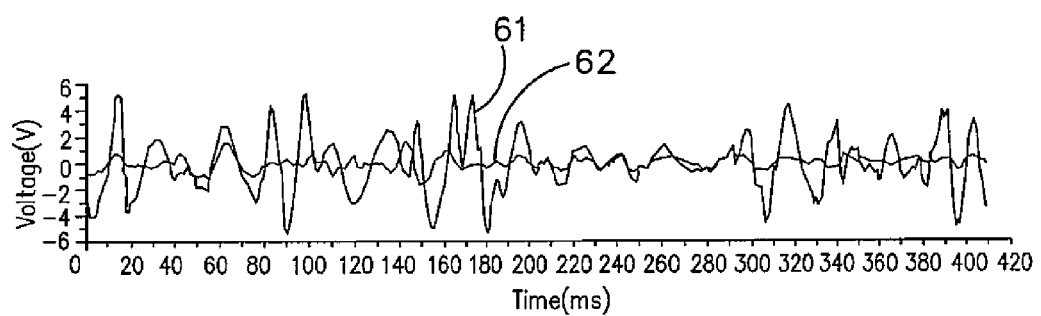
FIG. 8 illustrates an example of the increase in sensitivity achieved when using a higher order mode regenerator in a modalmetric system in accordance with the invention.
Figure 9:
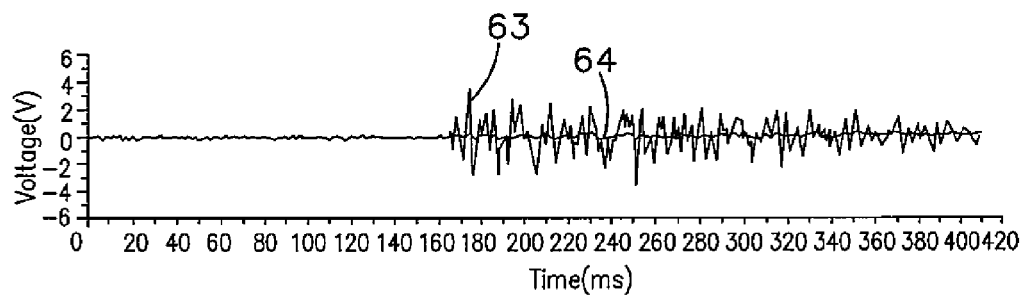
FIG. 9 illustrates yet another example of the increase in sensitivity achieved when using a higher order mode regenerator in a modalmetric system in accordance with the invention.

An example of the increase in sensitivity that the embodiment described by FIGS. 3 and 4 can achieve when compared with the arrangement described by FIG. 2 is illustrated in FIGS. 8 and 9.

FIG. 8 shows the signals received for a modalmetric sensor that has a sensing MM fibre length of 200 meters and a SM fibre lead-in of 1 km. The 62.5/125 µm sensing fibre was housed in a standard loose tube fibre optic cable and attached to a weld-mesh fence. A disturbance to the sensing fibre was produced by kicking the fence panel. The larger signal 51 is that obtained when using a 50/125 µm higher order mode regenerator as shown in FIG. 5. The smaller signal 52 is that obtained when no higher order mode regenerator is used in a configuration as shown in FIG. 2. To achieve an accurate comparison, two separate fibres were used simultaneously in the fibre cable attached to the fence for each embodiment such that the same disturbance acted on both sensing fibres simultaneously. The laser signals for both of these sensing fibres were also derived from the same laser by using a splitter. Separate detectors with identical electronic amplifiers were used to process the signal. Also, the signal 61 obtained using the higher order mode regenerator was also adjusted to compensate for the small additional loss caused by propagating from a 62.5/125 µm fibre to a 50/125 µm as well as the different loss in going from a 50/125 µm to a 9/125 µm fibre when compared with going from a 62.5/125 µm to a 9/125 µm. It can be clearly seen from this example that the addition of the higher order mode regenerator leads to a significantly larger sensing signal when compared with the signal obtained in its absence.

A further example of the superior sensitivity achieved with the use of a higher order mode regenerator is shown in FIG. 9. For this example, the same setup as for the results shown in FIG. 8 was used to compare the signals obtained when the fence is tapped to simulate a short transient event. The signal 53 obtained by use of a higher order mode regenerator compared with the signal 64 when no higher order mode generator was used demonstrates a superior sensitivity to the disturbance event. Indeed the sensor which does not use the higher order mode regenerator yields a negligible signal.

Figure 10:
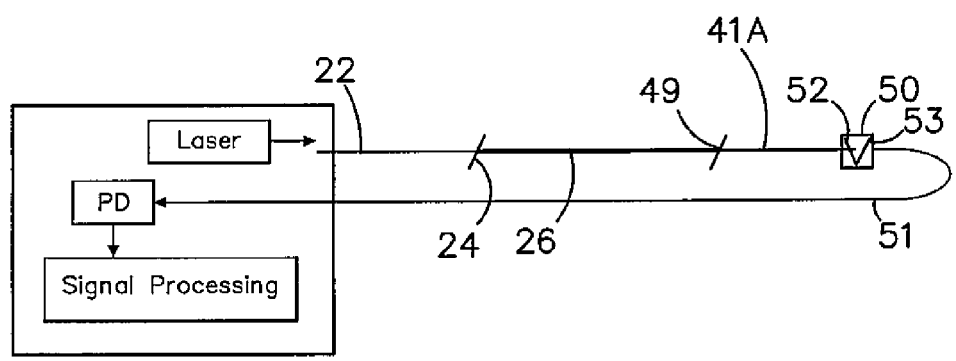
FIG. 10 illustrates a further embodiment of implementing the invention described herein using a transmissive modalmetric arrangement.

As illustrated in FIG. 10, the invention described herein can also be implemented in a transmissive modalmetric sensor configuration whereby a higher order mode regenerator 41A is placed in between the multimode sensing fibre 26 and a receiving single mode fibre. This transmissive sensor employs components which are the same as those of the reflective modalmetric sensor of FIG. 3 and like components have been identified by like reference numerals. Essentially the difference in the transmissive arrangement is that the end of multimode fibre sensor 26 remote from single mode fibre 22 is not mirrored but is connected via a splice 49 to a second multimode fibre 41A which acts as the higher order mode regenerator. The other end of the multimode fibre 41A is then connected through a connection 50 to a second single mode fibre 51 through which light from the speckle pattern is directed to the detector 18. The end faces 52,53 of the multimode fibre 41A and single mode fibre 51 respectively within the connection 50 are disposed at an acute angle to one another to enhance sensitivity by the effects described in International Patent Application No. PCT/AU2009/000279.

Although in the illustrated embodiments of the invention the adjacent end faces of the multimode sensor fibre and the interrogating single mode fibre are disposed at an acute angle to one another to achieve maximum sensitivity it should be appreciated that other arrangements are possible within the scope of the present invention which produces enhanced sensitivity by the higher order mode regenerator. It should be understood that the invention is not limited to the illustrated arrangements and many modifications and variations will fall within the scope of the appended claims.

The claims defining the invention are as follows:

1. A modalmetric fibre sensor comprising
a multimode sensor fibre;
a light source for launching light into the multimode sensor fibre to produce a multimode speckle pattern of light at an end of said multimode sensor fibre;
a single mode fibre to receive light from the multimode speckle pattern;
a detector connected to the single mode fibre to detect the received light from the speckle pattern; and
a further multimode fibre disposed between said end of the sensor fibre and the single mode fibre such that the single mode fibre receives light from the speckle pattern by transmission through the further multimode fibre and the received light includes higher order modes regenerated in the further multimode fibre, wherein the further multimode fibre is overfilled with received light from the speckle pattern.

2. A modalmetric fibre sensor as claimed in claim 1, wherein said end of the sensor fibre is connected to a light receiving end of the further multimode fibre.

3. A modalmetric fibre sensor as claimed in claim 2, wherein said end of the sensor fibre and the light receiving end of the further multimode fibre are held spaced apart such that the light received by the further multimode fibre from the speckled pattern is in a divergent beam.

4. A modalmetric fibre sensor as claimed in claim 2, wherein said end of the sensor fibre and the light receiving end of the further multimode fibre are connected by a beam expander.

5. A modalmetric fibre sensor as claimed in claim 1, wherein the further multimode fibre has a length of less than 100 meters.

6. A modalmetric fibre sensor as claimed in claim 5, wherein the further multimode fibre has a length of less than 10 meters.

7. A modalmetric fibre sensor as claimed in claim 6, wherein the further multimode fibre has a length in the range 30 to 100 cm.

8. A modalmetric fibre sensor as claimed in claim 7, wherein the further multimode fibre has a length in the range 45 to 55 cm.

9. A modalmetric fibre sensor as claimed in claim 1, wherein the further multimode fibre has a smaller core diameter than the sensor fibre.

10. A modalmetric fibre sensor as claimed in claim 9, wherein the core diameter of the further multimode fibre is less than 90% of the diameter of the sensor fibre.

11. A modalmetric fibre sensor as claimed in claim 9, wherein said end of the sensor fibre and the light receiving end of the further multimode fibre are engaged with one another.

12. A modalmetric fibre sensor as claimed in claim 1, wherein the light received by the single mode fibre is transmitted through end faces of the further multimode fibre and the single mode fibre, which end faces are disposed at an acute angle to one another.

13. A modalmetric fibre sensor as claimed in claim 12, wherein the end face of the further multimode fibre is normal to the multimode fibre axis and the end face of the single mode fibre is angled away from the normal to the axis of the single mode fibre through said acute angle.

14. A modalmetric fibre sensor as claimed in claim 12, wherein the acute angle is in the range 5° to 10°.

15. A modalmetric fibre sensor as claimed in claim 14, wherein said acute angle is in the range 6° to 9°.

16. A modalmetric fibre sensor as claimed in claim 15, wherein the light source is connected to said single mode fibre so as to launch light through the single mode fibre into said end of the multimode fibre via the further multimode fibre and the other end of the multimode fibre is mirrored for reflecting light back through the multimode fibre to produce the speckle pattern at said end of the multimode fibre.

17. A modalmetric fibre sensor as claimed in claim 16 wherein the light source and the detector are connected to the single mode fibre by a coupler.

18. A modalmetric fibre sensor as claimed in claim 1, wherein the light source launches light into another end of the sensor fibre remote from said end of that fibre for transmission through the sensor fibre, the further multimode fibre and the single mode fibre to the detector.

19. A modalmetric fibre sensor as claimed in claim 18, wherein the light source is connected to said another end of the sensor fibre via a further single mode fibre through which to launch light into the remote end of the sensor fibre.

\* \* \* \* \*